US011651317B2

United States Patent
Nagayoshi et al.

(10) Patent No.: US 11,651,317 B2
(45) Date of Patent: May 16, 2023

(54) WORK OPERATION ANALYSIS SYSTEM AND WORK OPERATION ANALYSIS METHOD

(71) Applicant: Hitachi, Ltd., Tokyo (JP)

(72) Inventors: Hiroto Nagayoshi, Tokyo (JP); Takuma Terada, Tokyo (JP); Nobuhiro Kakeno, Tokyo (JP); Toshihiro Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/969,499

(22) PCT Filed: Feb. 28, 2019

(86) PCT No.: PCT/JP2019/007962
§ 371 (c)(1),
(2) Date: Aug. 12, 2020

(87) PCT Pub. No.: WO2019/172093
PCT Pub. Date: Sep. 12, 2019

(65) Prior Publication Data
US 2020/0401981 A1 Dec. 24, 2020

(30) Foreign Application Priority Data
Mar. 5, 2018 (JP) .............................. JP2018-039060

(51) Int. Cl.
*G06Q 10/06* (2023.01)
*G06Q 10/0639* (2023.01)
(Continued)

(52) U.S. Cl.
CPC ... *G06Q 10/06393* (2013.01); *G06Q 10/0633* (2013.01); *G06Q 10/06398* (2013.01);
(Continued)

(58) Field of Classification Search
CPC ..................................................... G06Q 10/06
See application file for complete search history.

(56) References Cited

U.S. PATENT DOCUMENTS

| 10,548,512 B2 * | 2/2020 | Hausdorff ............ A61B 5/6831 |
| 2009/0070163 A1 * | 3/2009 | Angell .................. G06Q 10/04 |
| | | 705/7.26 |

(Continued)

FOREIGN PATENT DOCUMENTS

| CN | 103733153 A | 4/2014 |
| JP | 2011034234 A | 2/2011 |

(Continued)

OTHER PUBLICATIONS

International Search Report for related International Application No. PCT/JP2019/007962, dated May 7, 2019; English translation provided (2 pages).

(Continued)

*Primary Examiner* — Kurtis Gills
(74) *Attorney, Agent, or Firm* — Procopio, Cory, Hargreaves & Savitch LLP

(57) ABSTRACT

A work operation analysis system 11 includes: a deviant operation analysis unit 114 that analyzes a work video obtained by photographing work of a worker on a work process basis and, in the case where a deviant operation different from normal work has been detected, identifies the occurrence timing of the deviant operation; a work video accumulation unit (a normal work video accumulation unit 117 and a deviant work video accumulation unit 118) that accumulates a normal work video obtained by preliminarily photographing normal work and a deviant work video obtained when the deviant operation occurred; and a display unit (a display input device 111) that displays the normal work video and the deviant work video having predeter- (Continued)

mined time including the occurrence timing of the deviant operation.

11 Claims, 9 Drawing Sheets

(51) Int. Cl.
    *G06Q 10/0633*     (2023.01)
    *G06V 20/52*     (2022.01)
    *G06V 40/20*     (2022.01)
    *G06V 10/34*     (2022.01)

(52) U.S. Cl.
    CPC .............. *G06V 20/52* (2022.01); *G06V 40/23* (2022.01); *G06V 10/34* (2022.01)

(56) References Cited

U.S. PATENT DOCUMENTS

| | | | |
|---|---|---|---|
| 2009/0172772 A1* | 7/2009 | Souille | G06F 21/552 726/1 |
| 2010/0144440 A1* | 6/2010 | Arrasvuori | A63F 13/12 463/42 |
| 2010/0207762 A1* | 8/2010 | Lee | G06V 20/52 340/541 |
| 2012/0114183 A1 | 5/2012 | Kawaguchi et al. | |
| 2012/0290508 A1* | 11/2012 | Bist | G06F 16/437 706/10 |
| 2013/0275514 A1* | 10/2013 | Tanaka | H04L 67/22 709/204 |
| 2014/0350708 A1 | 11/2014 | Kobayashi | |
| 2016/0099951 A1* | 4/2016 | Kashyap | G06F 21/552 726/23 |
| 2016/0253618 A1 | 9/2016 | Imazawa et al. | |
| 2017/0296129 A1* | 10/2017 | Petterson | A61B 5/7278 |
| 2018/0033130 A1 | 2/2018 | Kimura et al. | |
| 2018/0136622 A1* | 5/2018 | Hatta | B25J 9/1651 |

FOREIGN PATENT DOCUMENTS

| | | |
|---|---|---|
| JP | 2016-157357 A | 9/2016 |
| JP | 2017-091009 A | 5/2017 |
| JP | 2017-122948 A | 7/2017 |
| JP | 2018022210 A | 2/2018 |
| WO | 2011/148439 A1 | 12/2011 |

OTHER PUBLICATIONS

Chinese Office Action dated Oct. 8, 2021, directed to the CN counterpart application No. 201980011117.0, in 27 pages.

Korean Office Action dated Nov. 30, 2021, directed to the KR counterpart application No. 10-2020-7024001, in 4 pages.

\* cited by examiner

FIG. 2

| SN | OCCURRENCE PLACE | WORK PROCESS START TIMING | DEVIANT TIMING AT USUAL TIME | DEVIANT TIMING ON NORMAL OPERATION TIME AXIS | DEVIANT FACTOR | DETAIL OF DEVIANT FACTOR |
|---|---|---|---|---|---|---|
| 01001 | N-PROCESS ON A-LINE | 2017/09/25 10:15:00.000 | 2017/09/25 10:15:01.500 | 00:00:01.500 | WORK POSITION DEVIATION | RIGHT HAND |
| 01110 | N-PROCESS ON A-LINE | 2017/09/26 11:15:30.300 | 2017/09/26 11:15:33.300 | 00:00:03.300 | WORK TIME DEVIATION | FAST WORK |
| 01135 | N-PROCESS ON A-LINE | 2017/09/26 13:30:00.000 | 2017/09/26 13:30:03.000 | 00:00:03.000 | WORK POSITION DEVIATION | LEFT HAND |
| 01150 | N-PROCESS ON A-LINE | 2017/09/26 14:13:00.800 | 2017/09/26 14:13:05.800 | 00:00:05.800 | WORK TIME DEVIATION | SLOW WORK |
| 01200 | N-PROCESS ON A-LINE | 2017/09/26 15:10:10.000 | 2017/09/26 15:10:19.200 | 00:00:09.200 | WORK POSITION DEVIATION | HEAD |
| : | : | : | : | : | : | : |

FIG. 3

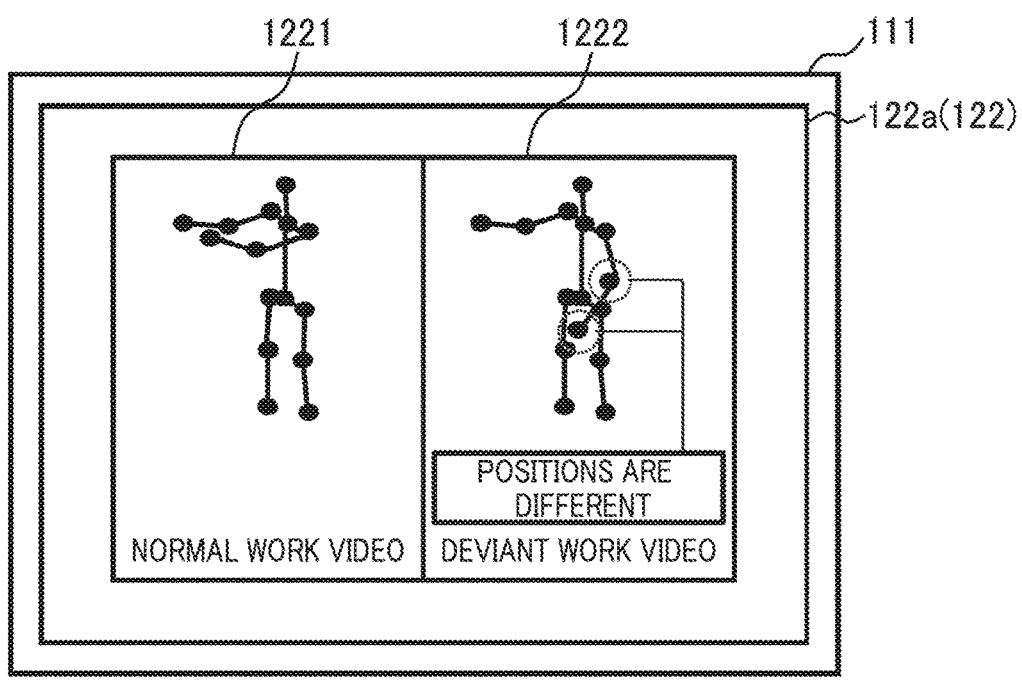

FIG. 6

PAST DEVIANT OPERATION

| SERIAL NUMBER | OCCURRENCE PLACE | WORK PROCESS START TIMING | DEVIANT TIMING AT USUAL TIME | DEVIANT TIMING ON NORMAL OPERATION TIME AXIS | DEVIANT FACTOR | DETAIL OF DEVIANT FACTOR |
|---|---|---|---|---|---|---|
| 01001 | N-PROCESS ON A-LINE | 2017/09/25 10:15:00.000 | 2017/09/25 10:15:01.500 | 00:00:01.500 | WORK POSITION DEVIATION | RIGHT HAND |
| 01110 | N-PROCESS ON A-LINE | 2017/09/26 11:15:30.300 | 2017/09/26 11:15:33.300 | 00:00:03.300 | WORK TIME DEVIATION | FAST WORK |
| 01135 | N-PROCESS ON A-LINE | 2017/09/26 13:30:00.000 | 2017/09/26 13:30:03.000 | 00:00:03.000 | WORK POSITION DEVIATION | LEFT HAND |
| 01150 | N-PROCESS ON A-LINE | 2017/09/26 14:13:00.800 | 2017/09/26 14:13:05.800 | 00:00:05.800 | WORK TIME DEVIATION | SLOW WORK |
| 01200 | N-PROCESS ON A-LINE | 2017/09/26 15:10:10.000 | 2017/09/26 15:10:19.200 | 00:00:09.200 | WORK POSITION DEVIATION | HEAD |

FIG. 7

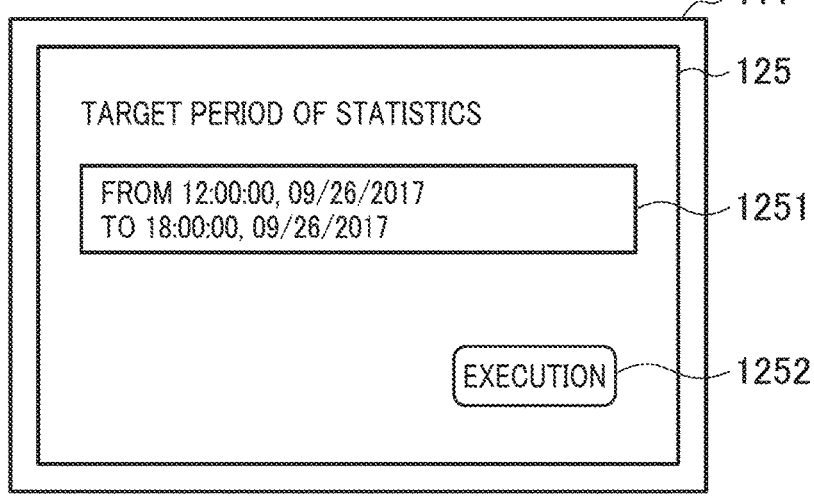

WORK OPERATION ANALYSIS SYSTEM AND WORK OPERATION ANALYSIS METHOD

CROSS-REFERENCE TO RELATED APPLICATIONS

This application is a U.S. National Stage entry of PCT Application No: PCT/JP2019/007962 filed 28 Feb. 2019, which claims priority to Japanese Patent Application No. 2018-039060, filed 5 Mar. 2018, the contents of which are incorporated herein by reference.

TECHNICAL FIELD

The present invention relates to a work operation analysis system and a work operation analysis method, and can be preferably applied to a work operation analysis system and a work operation analysis method that analyze a deviant operation in work in which a work procedure is prescribed for each elemental work configuring a work process.

BACKGROUND ART

In the field of assembly work, a worker is required to perform assembly work of products in accordance with a prescribed work procedure. The work procedure is defined to maintain the quality of products. In the case where an operation (a deviant operation) deviated from the definition is performed in work of assembly work of products, the possibility that a problem occurs in the quality of the products becomes high. Therefore, a system that acquires information related to an operation of a worker using various sensors and automatically detects a deviant operation has been needed. In the case where the deviant operation has been detected by such a system, the quality of the products is guaranteed by conducting, for example, countermeasures such as a re-inspection for the products as work objects and discarding of the products themselves.

For example, Patent Literature 1 discloses an abnormal work detection method that detects a deviant operation by comparing an image obtained by photographing a work condition with an image obtained by photographing work in a normal state. In the abnormal work detection method disclosed in Patent Literature 1, the deviant operation of not only the states that completely match but also the states that vaguely match can be detected by adopting the viewpoint of similarity in the comparison.

In addition, for example, Patent Literature 2 discloses a worker quality control method that detects a deviant operation by comparing a traffic line detected from an image obtained by photographing a work condition with a traffic line a normal state in a work site where the same work is repeatedly performed.

CITATION LIST

Patent Literature

Patent Literature 1: Japanese Unexamined Patent Application Publication No. 2017-091009
Patent Literature 2: Japanese Unexamined Patent Application Publication No. 2016-157357

SUMMARY OF INVENTION

Technical Problem

However, the main purpose of the abnormal work detection method disclosed in Patent Literature 1 is to realize highly-accurate detection of a deviant operation caused when a body part of a worker is located at a position different from that in normal work, and a deviant operation caused when work time is different from that assumed in normal work cannot be detected. In addition, the viewpoint of detecting which of elemental works configuring a series of work processes the deviant work has occurred in is not disclosed, and thus there has been a problem that an effect of improvement support for a worker and a supervisor cannot be expected much.

In addition, in the worker quality control method disclosed in Patent Literature 2, the deviant operation can be detected in consideration of the position of a body part of a worker, but the deviant operation can be detected only after a series of work processes is finished. Thus, there has been a problem of lack of immediacy. If the deviant operation cannot be detected in the middle of work in a series of work processes, the coverage of the countermeasures (a re-inspection for the products as work objects and discarding of the products themselves as described above) when the deviant operation occurs is expanded. As a result, the progress of work stagnates, and further a burden on the manufacturing cost is disadvantageously increased.

The present invention has been made in consideration of the above-described points, and proposes a work operation analysis system and a work operation analysis method that early notify occurrence of a deviant operation in work and can support a determination of how to modify the work.

Solution to Problem

In order to solve the above-described problems, the present invention provides a work operation analysis system comprising: a deviant operation analysis unit that analyzes a work video obtained by photographing work of a worker on a work process basis and, in the case where a deviant operation different from normal work has been detected, identifies the occurrence timing of the deviant operation; a work video accumulation unit that accumulates a normal work video obtained by preliminarily photographing normal work and a deviant work video obtained when the deviant operation occurred; and a display unit that displays the normal work video and the deviant work video having predetermined time including the occurrence timing of the deviant operation.

In addition, in order to solve the above-described problems, the present invention provides a work operation analysis method comprising: a normal work video accumulation step of accumulating a normal work video obtained by Preliminarily photographing normal work; a deviant operation analysis step of analyzing a work video obtained by photographing work of a worker on a work process basis and, in the case where a deviant operation different from normal work has been detected, identifying the occurrence timing of the deviant operation; a deviant work video accumulation step of accumulating a deviant work video obtained when the deviant operation occurred; and a display step of displaying the normal work video and the deviant work video having predetermined time including the occurrence timing of the deviant operation identified in the deviant operation analysis step on a display device.

Advantageous Effects of Invention

According to the present invention, it is possible to early notify occurrence of a deviant operation in work to support a determination of how to modify the work.

BRIEF DESCRIPTION OF DRAWINGS

FIG. 2 is a diagram for describing history information of a deviant operation.

FIG. 3 is a diagram for showing an example of a work video screen in the case where a deviant factor is work position deviation.

FIG. 6 is a diagram for showing an example of a past deviant operation confirmation screen.

FIG. 7 is a diagram for showing an example of a target period decision screen.

DESCRIPTION OF EMBODIMENTS

Hereinafter, an embodiment of the present invention will be described with reference to the drawings.

(1) First Embodiment

Figure 1:
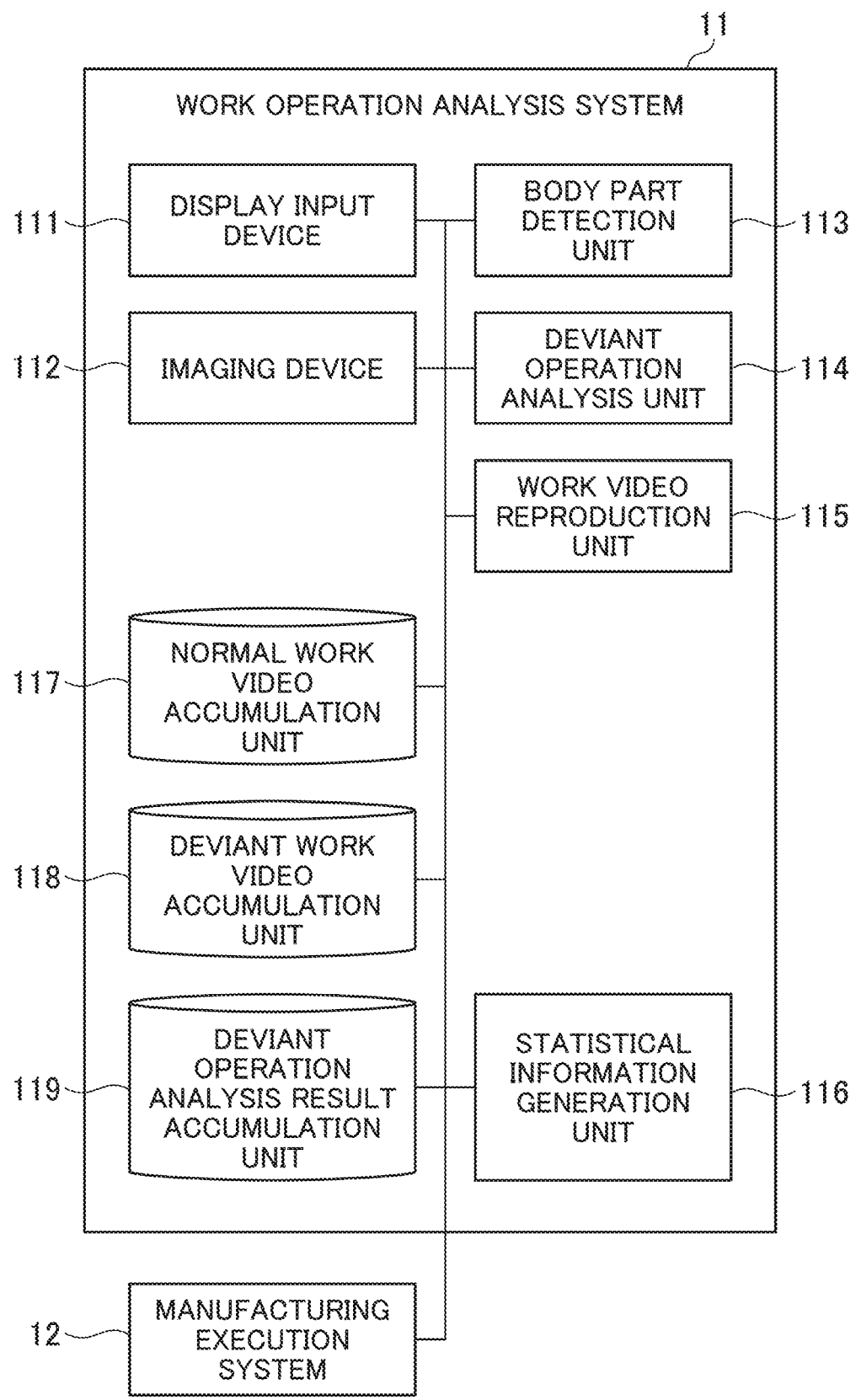
FIG. 1 is a block diagram for showing a configuration example of a work operation analysis system according to a first embodiment of the present invention.

FIG. 1 is a block diagram for showing a configuration example of a work operation analysis system according to a first embodiment of the present invention. A configuration of a work operation analysis system 11 according to the first embodiment will be described with reference to FIG. 1.

The work operation analysis system 11 is a system that analyzes a work operation of a worker who performs assembly work of products, and is realized using, for example, a computing machine such as a personal computer. The work operation analysis system 11 is connected to a manufacturing execution system 12.

The manufacturing execution system 12 is also called as MES (Manufacturing Execution System), and is a system that controls execution of a production device used for assembly work of products. Since the MES is a generally-known system, the detailed explanation thereof will be omitted. However, the MES has, for example, a function of monitoring and managing machines in a plant and the like and work of a worker.

As shown in FIG. 1, the work operation analysis system 11 includes a display input device 111, an imaging device 112, a body part detection unit 113, a deviant operation analysis unit 114, a work video reproduction unit 115, a statistical information generation unit 116, a normal work video accumulation unit 117, a deviant work video accumulation unit 118, and a deviant operation analysis result accumulation unit 119.

Among those, the display input device 111 is input/output means, and is, for example, a touch panel, a smart watch, or the like. In addition, the imaging device 112 is imaging means having a photographing function, and is, for example, a camera, a depth sensor, or the like. It should be noted that in the case where the work operation analysis system 11 is, for example, a computing machine such as a personal computer, the display input device 111 and the imaging device 112 do not necessarily need to be provided therein, and may be external input/output means and imaging means that can be connected to the computing machine.

In addition, each of the body part detection unit 113, the deviant operation analysis unit 114, the work video reproduction unit 115, and the statistical information generation unit 116 is functional means that performs a predetermined process to be described later, and is realized in such a manner that a CPU (Central Processing Unit) and the like of the work operation analysis system 11 read and execute programs.

In addition, each of the normal work video accumulation unit 117, the deviant work video accumulation unit 118, and the deviant operation analysis result accumulation unit 119 is storage means that stores (accumulates) predetermined information to be described later, and is, for example, a storage medium (for example, an HDD (Hard Disk Drive) or the like) of the work operation analysis system 11. It should be noted that in the case where the work operation analysis system 11 is, for example, a computing machine such as a personal computer, the above-described storage units 117 to 119 do not necessarily need to be provided therein, and may be external storage media (for example, an HDD and the like connected through a USB terminal) that can be connected to the computing machine.

Hereinafter, a function of each configuration of the work operation analysis system 11 will be described.

The display input device 111 displays information for a worker and a supervisor on a display screen or the like, and accepts inputs from the worker and the supervisor through operations of input keys or the like.

The imaging device 112 photographs a state in which a worker is working. It should be noted that the imaging device 112 photographs a video (an animation) in the following description. However, the imaging device 112 may photograph, for example, plural still images along a time series.

The body part detection unit 113 analyzes the video photographed by the imaging device 112 to acquire "positional information of body part of the worker". Here, as an example of the "positional information of the body parts of the worker", "information indicating joint information of the worker" is conceivable. Namely, the body part detection unit 113 can acquire the positional information of the body parts of the worker by acquiring the positions of plural joints of the worker from the photographed video. It should be noted that the body parts whose positional information is acquired are not limited to the body parts of the entire body, and may be partial body Parts of only the upper half of the body.

It should be noted that a concrete method of acquiring the positional information of body parts of the worker by analyzing the video with the body part detection unit 113 in the embodiment is not particularly limited, and a method that has been well known from the past can be used. Specifically, for example, in the case where the imaging device 112 is a general color camera, the body part detection unit 113 can acquire the positional information of the body parts of the worker by performing a process using a method by Toshev et al. (A. Toshev and C. Szegedy, "Deeppose: Human pose estimation via deep neural networks," in Proceedings of the IEEE Conference on Computer Vision and Pattern Recognition, 2014, pp. 1653-1660). In addition, for example, in the case where the imaging device 112 is a depth sensor, the body part detection unit 113 can acquire the positional information of the body parts of the worker by performing a process using a method by Shotton et al. (J. Shotton, T. Sharp, A. Kipman, A. Fitzgibbon, M. Finocchio, A. Blake, M. Cook, and R. Moore, "Real-time human pose recognition in parts from single depth images," Communications of the ACM, vol. 56, no. 1, pp. 116-124, 2013).

It should be noted that the work operation analysis system 11 according to the embodiment may be configured in such a manner that the imaging device 112 also has a function of the body part detection unit 113, namely, the imaging device 112 can extract the positional information of the body parts of the worker from the photographed video. In such a configuration, the body part detection unit 113 is not necessary.

By using a video (a normal work video) obtained by photographing a state of normal work as a standard for comparison, the deviant operation analysis unit 114 determines the presence or absence of a deviant operation (a detection of a deviant operation) by analyzing time-series information on the "positional information of the body parts of the worker" acquired by the body part detection unit 113. In addition, in the case where a deviant operation has been detected, the deviant operation analysis unit 114 identifies the timing when the deviant operation occurred (the identification of a deviant timing) and identifies a factor of the deviant operation (the identification of a deviant factor). These analysis processes by the deviant operation analysis unit 114 are carried out for each work process. In addition, the normal work video is preliminarily photographed, and is stored (accumulated) in the normal work video accumulation unit 117.

Here, the "work process" is configured using combinations of elemental works each having a smaller particle size. Specifically, for example, each work such as holding a part by hand, wiping off dirt of a part, and assembling a part corresponds to the elemental work, and a series of these elemental works corresponds to the work process. In prescribed normal work, a work timing is preliminarily set to each elemental work configuring a single work process. In other words, which elemental work should be carried out is prescribed depending on elapsed time from the start of the work process in the normal work.

In addition, the "deviant factor" can be classified into a factor that the position of a body part is different from that in the normal work and a factor that the required time of an elemental work is different from predetermined time prescribed in the normal work (longer/shorter). Hereinafter, the former deviant factor will be referred to as "work position deviation", and a body part where deviation was detected will be referred to as a "deviant part". In addition, the latter deviant factor will be referred to "work time deviation".

It should be noted that in order to identify the deviant timing, the deviant part, and the work time deviation, for example, the Hidden Markov Model can be used. If the Hidden Markov Model is used, the state transition of positional information can be modeled on the basis of time-series information of the positional information of the body parts in plural kinds of normal work. Hereinafter, the model will be referred to as a "state transition model of normal work".

A concrete analysis process by the deviant operation analysis unit 114 will be described in detail.

First, the deviant operation analysis unit 114 acquires a work process start timing. In order to acquire the timing, for example, when a worker is located at a predetermined position or has a predetermined posture, it is determined that the work process has been started by using an analysis result by the body part detection unit 113. In addition, if the work process start timing is a timing, such as a timing when a part is taken out from a production device, that can be detected from the side of the production device, the work process start timing may be acquired from the manufacturing execution system 12 controlling the production device.

Then, after acquiring the work process start timing, the deviant operation analysis unit 114 can calculate likelihood while matching the time-series information of the body parts acquired from the work video with the state of the state transition model of normal work by using, for example, Viterbi algorithm, and can identify the timing when the deviant operation occurred (the identification of a deviant timing). Namely, the deviant operation analysis unit 114 can detect the deviant operation and can identify the deviant timing.

Here, for example, two expression methods of the deviant timing are conceivable as described below. The first expression method is an expression method as usual time (the deviant timing at usual time). In this case, the deviant timing can be expressed using the occurrence time. The second expression method is an expression method as time on the time axis using a timing in the normal work as a standard (the deviant timing on the normal work time axis). This can be calculated by matching the time-series information of the positional information of the body parts acquired from the work video with each state of the state transition model of normal work. Specifically, for example, if there is a predetermined state that occurs after five seconds from the start of the work process in the normal work and in the case where a specific part in the time-series information of the positional information of the body parts acquired from the work video matches the predetermined state and the deviant operation occurs at the timing, the deviant timing can be expressed as "after five seconds".

It is assumed that each state at the timing in the state transition model of normal work preliminarily holds the positional information of the body parts. Namely, body positional information in each state at the timing is associated with the normal work video accumulated in the normal work video accumulation unit 117. In such a case, the deviant operation analysis unit 114 can determine the presence or absence of work position deviation and the deviant part by comparing each state at the timing in the state transition model of normal work with information of the timing in the time-series information of the positional information of the body parts acquired from the work video. Namely, the deviant operation analysis unit 114 can identify a deviant factor related to the work position deviation.

In addition, by comparing the state transition model of normal work with the time-series information of the positional information of the body parts acquired from the work video, the deviant operation analysis unit 114 can recognize how long a state corresponding to each state in the state transition model of normal work has continued in the time-series information of the positional information of the body parts acquired from the work video. More specifically, by associating each state in the state transition model of normal work with the elemental work executed in the state, the deviant operation analysis unit 114 can determine whether the time required in each elemental work is normal (within allowable time), longer (much slower than the normal work), or shorter (much faster than the normal work) as compared to predetermined time (work time in the normal work). Namely, the deviant operation analysis unit 114 can identify a deviant factor related to the work time deviation.

As described above, the deviant operation can be detected by an analysis performed by the deviant operation analysis unit 114. Further, in the case where the deviant operation has occurred, the deviant timing and the deviant factor can be identified. In addition, in the case where the deviant operation analysis unit 114 has detected the deviant operation by an analysis, the work video associated with the deviant operation is stored (accumulated) in the deviant work video accumulation unit 118 as the deviant work video.

In addition, in the case where the deviant operation analysis unit 114 has detected the deviant operation by an analysis, the identified deviant timing and deviant factor of the deviant operation are stored (accumulated) in the deviant operation analysis result accumulation unit 119 as a history (a history information 121) of the deviant operation.

FIG. 2 is a diagram for describing history information of the deviant operation. The history information 121 shown in FIG. 2 is a concrete example of a history of the deviant operations accumulated in the deviant operation analysis result accumulation unit 119.

As the configuration of the history information 121, arbitrary items can be provided. However, the history information 121 is configured using, for example, a serial number (SN) 1211, an occurrence place 1212, a work process start timing 1213, a deviant timing at usual time 1214, a deviant timing on normal operation time axis 1215, a deviant factor 1216, and a detail of deviant factor 1217 in FIG. 2.

In the history information 121, a unique number may be given to the serial number (SN) 1211 for each of the detected deviant operations. However, if the serial number (SN) 1211 is set to match the serial number of a product to be assembled, cooperation with the manufacturing execution system 12 can be realized. In addition, a place where the deviant operation occurred is recorded in the occurrence place 1212, and a timing when the work process in which the deviant operation was detected was started is recorded in the work process start timing 1213.

In addition, the deviant timing identified by the analysis performed by the deviant operation analysis unit 114 is recorded in the deviant timing at usual time 1214 and the deviant timing on normal operation time axis 1215 using the above-described first expression method (deviant timing at usual time) or the second expression method (the deviant timing on the normal work time axis). In addition, the deviant factor (for example, "work position deviation" or "work time deviation") identified by the analysis performed by the deviant operation analysis unit 114 is recorded in the deviant factor 1216, and detail information on the deviant factor is recorded in the detail of deviant factor 1217.

Specifically, for example, in the case of the first row of the data string in FIG. 2, an event that the deviant operation related to the serial number "01001" occurred in "N-process on A-line" is recorded, and the start timing of the work process (N-process) and the deviant timing are recorded together. Further, the deviant factor of the deviant operation is recorded as "work position deviation" of "right hand".

Next, the work video reproduction unit 115 will be described. In the case where the deviant operation has been detected, the work video reproduction unit 115 displays the normal work video corresponding to predetermined time before and after the deviant operation was performed and the deviant work video on the display input device 111 in a comparison manner (a work video display).

Specifically, in the case where the deviant operation has been detected by the analysis performed by the deviant operation analysis unit 114, the work video reproduction unit 115 reads the normal work video, the corresponding deviant work video, and the deviant timing and the deviant factor of the deviant operation from the normal work video accumulation unit 117, the deviant work video accumulation unit 118, and the deviant operation analysis result accumulation unit 119, respectively. Then, the work video reproduction unit 115 cuts a video having predetermined time before and after the read deviant timing from each of the read normal work video and deviant work video, and displays each of the cut work videos on the display input device 111 as the work video display (see the work video screen 122 of FIG. 3 and FIG. 4).

At this time, the work video reproduction unit 115 can display the work videos in different display manners in accordance with the read deviant factor. FIG. 3 is a diagram for showing an example of the work video screen in the case where the deviant factor is the work position deviation, and FIG. 4 is a diagram for showing an example of the work video screen in the case where the deviant factor is the work time deviation.

In the case of FIG. 3, a work video screen 122a is displayed on the display screen of the display input device 111. The work video screen 122a is configured in such a manner that a reproduction screen 1221 of the normal work video and a reproduction screen 1222 of the deviant work video are displayed side by side. Further, "positions are different" is described on the reproduction screen 1222 of the deviant work video by pointing the circled two joints of the left hand. Namely, in the case where the deviant factor is the work position deviation, detail information teaching the deviant factor (the work position deviation) and the deviant part of the detected deviant operation is displayed.

Figure 4:
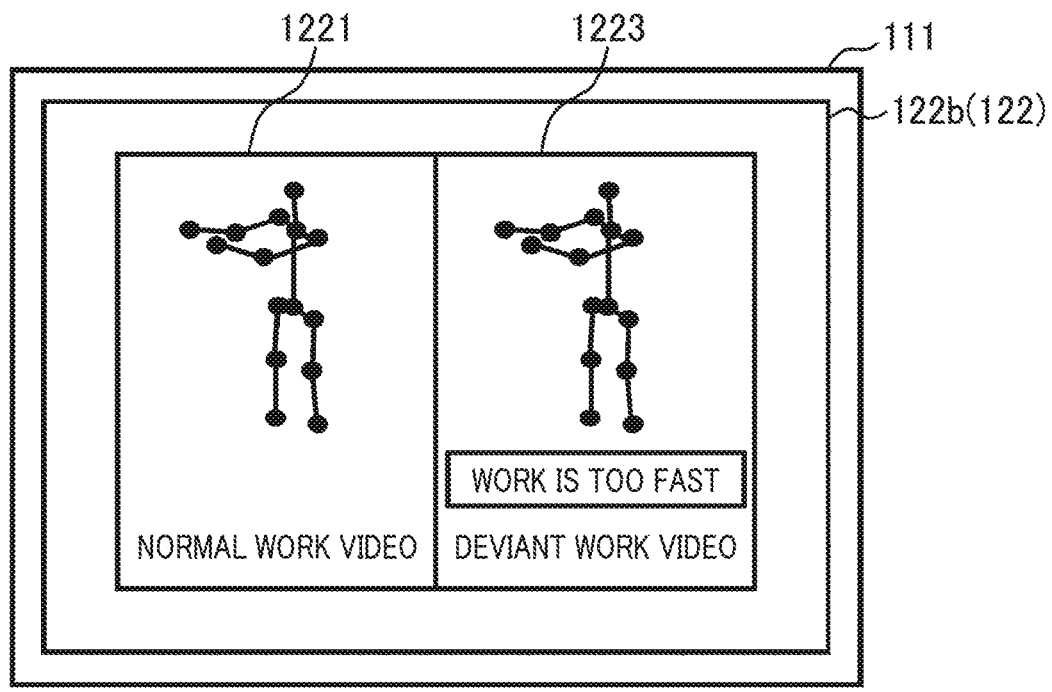
FIG. 4 is a diagram for showing an example of the work video screen in the case where the deviant factor is work time deviation.

On the other hand, in the case of FIG. 4, a work video screen 122b is displayed on the display screen of the display input device 111. The work video screen 122b is configured in such a manner that a reproduction screen 1221 of the normal work video and a reproduction screen 1223 of the deviant work video are displayed side by side. Further, "work is too fast" is described on the reproduction screen 1223 of the deviant work video. Namely, in the case where the deviant factor is the work time deviation, detail information teaching only the deviant factor (the work time deviation) of the detected deviant operation is displayed.

Then, a worker or a supervisor can recognize the detailed deviant timing such as which of the elemental works of the work process the deviant work has occurred in by showing the work video screen 122 exemplified in FIG. 3 or FIG. 4. In addition, the worker or the supervisor can easily and visually recognize the type of deviation, and can confirm the normal work of the part. Thus, the worker or the supervisor can immediately understand, determine, and decide how to modify the target elemental work. In other words, a support effect of work learning can be expected for the worker and a support effect of coaching the worker can be expected for the supervisor by displaying and outputting the work video screen 122.

In the work operation analysis system 11, the display input device 111 can display not only the above-described work video screen 122 but also various display screens to a user (a worker, a supervisor, or the like) in accordance with situations and operations.

Figure 5:
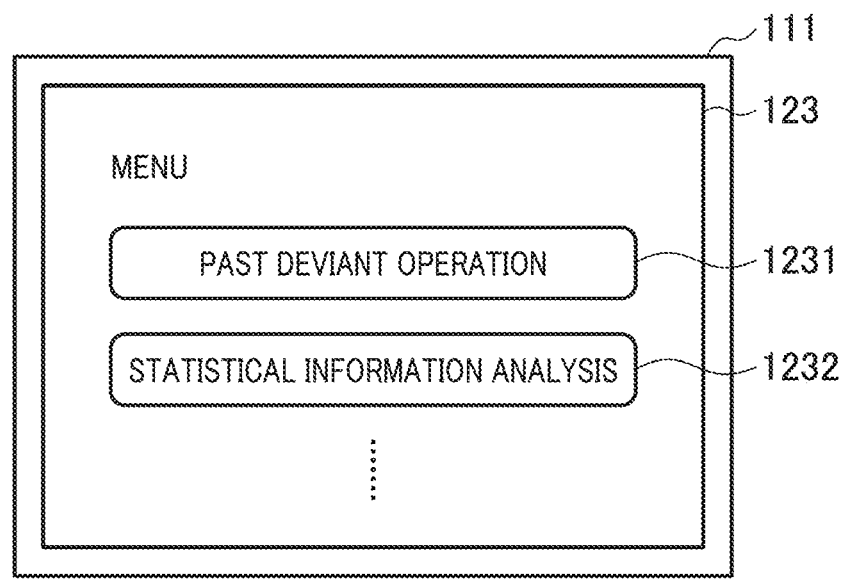
FIG. 5 is a diagram for showing an example of an operation standby screen.

For example, in a situation where there is no other screen to be displayed, the display input device 111 can display an operation standby screen waiting for an operation from a user. FIG. 5 is a diagram for showing an example of the operation standby screen.

On an operation standby screen 123 exemplified in FIG. 5, displayed are a button 1231 selected when a past deviant operation is to be displayed and a button 1232 selected when statistical information related to the deviant operation is to be analyzed. It should be noted that each of the buttons 1231 and 1232 displayed on the operation standby screen 123 is merely an example, and the buttons or the like corresponding to other displays can be displayed.

In the case where the button 1231 is selected (for example, pressed on a touch panel) when the operation standby screen 123 is displayed, the history (the history information 121) of the deviant operations accumulated in the deviant operation analysis result accumulation unit 119 is read, and a past deviant operation confirmation screen on which past deviant operations can be confirmed from a list is displayed.

FIG. 6 is a diagram for showing an example of the past deviant operation confirmation screen. On a past deviant operation confirmation screen 124 exemplified in FIG. 6, displayed are a list screen 1241 on which the history of the deviant operations is listed and displayed and a button 1242 selected when any one of the deviant operations is to be displayed in detail. The display content of the list screen 1241 may be the same as the history information 121 described in FIG. 2. When the button 1242 is selected (for example, pressed) in a state where any one of the past deviant operations displayed on the list screen 1241 is selected, detail information (specifically, for example, the work video screen 122 shown in FIG. 3 and FIG. 4) of the selected past deviant operation is displayed on the display input device 111.

As described above, a worker or a supervisor can retroactively confirm information of the deviant operations that occurred in the past by displaying the past deviant operations in a confirmable manner.

On the other hand, in the case where the button 1232 is selected (for example, pressed on a touch panel) when the operation standby screen 123 is displayed, a target period decision screen on which a target period of statistical information to be analyzed is decided is displayed as a preparation stage for analyzing statistical information related to the deviant operations.

FIG. 7 is a diagram for showing an example of the target period decision screen. On a target period decision screen 125 exemplified in FIG. 7, displayed are a target period selection field 1251 in which a user arbitrarily selects a target period of statistical information to be analyzed and a button 1252 selected (executed) when the target period selected in the target period selection field 1251 is fixed. If the target period is selected in the target period selection field 1251 and the button 1242 is selected (for example, pressed) when the target period decision screen 125 is displayed, the statistical information of the deviant operations is analyzed by the statistical information generation unit 116 while referring to the history (the history information 121) of the deviant operations in the target period, and an analysis result is displayed (an analysis result display).

The statistical information generation unit 116 reads the history of the deviant operations in which a work process start timing is included in the target period of the statistics decided in the target period selection field 1251 from the history (the history information 121) of the deviant operations accumulated in the deviant operation analysis result accumulation unit 119, and executes a predetermined process of generating the statistical information. Then, the statistical information generation unit 116 allows the display screen of the display input device 111 to display the statistical information (for example, a graph in a predetermined format) generated as described above as the analysis result display (see the analysis result display screen 126 of FIG. 8 and FIG. 9).

Figure 8:
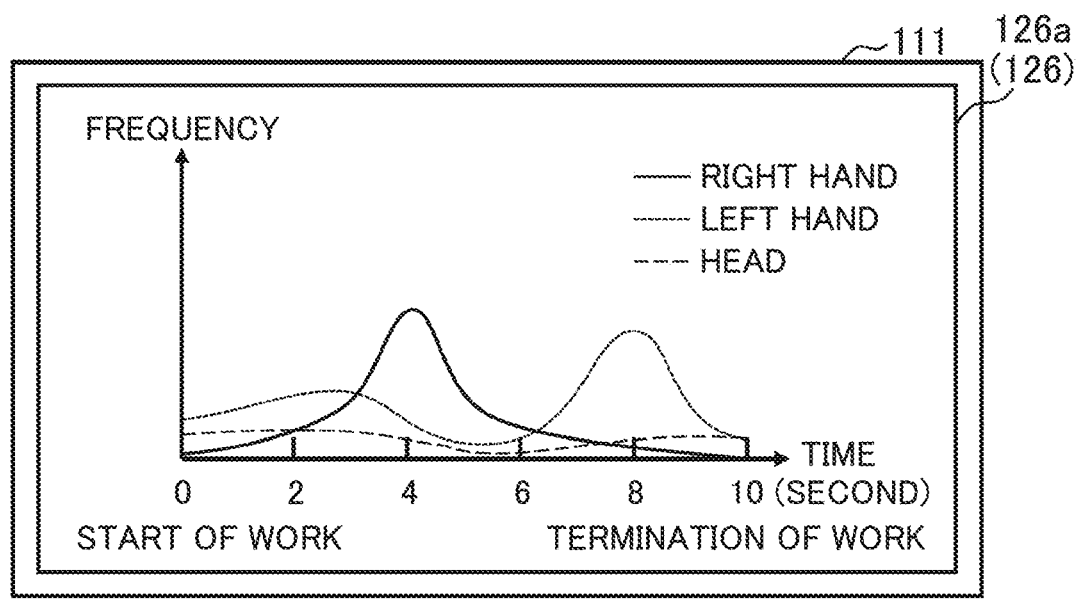
FIG. 8 is a diagram for showing an example of an analysis result display screen in the case where the deviant factor is the work position deviation.
Figure 9:
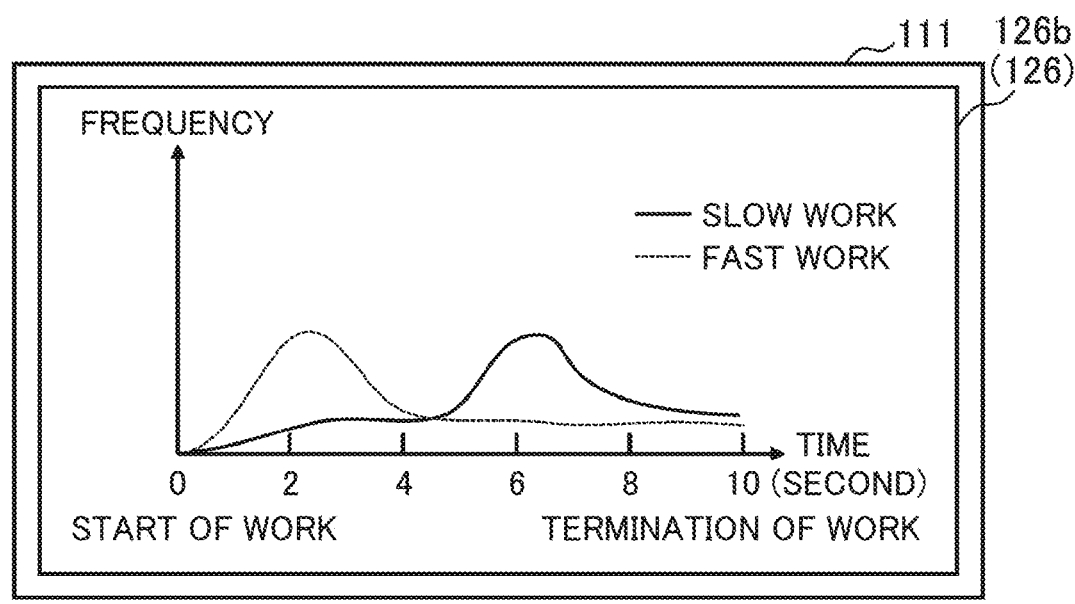
FIG. 9 is a diagram for showing an example of the analysis result display screen in the case where the deviant factor is the work time deviation.

At this time, the statistical information generation unit 116 can display the above-described analysis result in different display manners in accordance with the type of deviant factor. FIG. 8 is a diagram for showing an example of the analysis result display screen in the case where the deviant factor is the work position deviation, and FIG. 9 is a diagram for showing an example of the analysis result display screen in the case where the deviant factor is the work time deviation. Each of an analysis result display screen 126a of FIG. 8 and an analysis result display screen 126b of FIG. 9 is an example of the analysis result display screen 126, and shows a graph in which a time axis from the start of the work process to the end of the work process in the normal work is represented by the horizontal axis (the work process start timing is "0" second) and generation frequency of the deviant timing on the normal work time axis is represented by the vertical axis. It should be noted that the value shown on the vertical axis is not limited to the generation frequency, and for example, average likelihood or the like may be displayed.

Specifically, the analysis result display screen 126a of FIG. 8 is an example of a display screen in the case where the deviant factor is the work position deviation, and illustrates the generation frequency of the deviant timing on the normal work time axis in each case where the work position deviation is "right hand", left hand", or "head". FIG. 8 shows a case in which the work position deviation of the right hand frequently occurs after four seconds from the start of the work process and the work position deviation of the left hand frequently occurs after eight seconds from the start of the work process. Namely, the case means that the elemental work of the right hand or the left hand is hindered at these timings, and suggests the necessity of improvement.

In addition, the analysis result display screen 126b of FIG. 9 is an example of a display screen in the case where the deviant factor is work time deviation, and illustrates the generation frequency by regarding the work as "slow work" in the case where the work time is longer than predetermined time (the work time in the normal work) and the work as "fast work" in the case where the work time is shorter than the predetermined time (the work time in the normal work). FIG. 9 shows a case in which the "slow work" frequently occurs after six seconds from the start of the work process, and thus suggests that a factor hindering the normal work possibly exits at this timing. Smoother work can be expected by removing the factor. On the other hand, FIG. 9 shows a case in which the "fast work" frequently occurs after two seconds from the start of the work process, and thus suggests that implementation of the elemental work at this timing is possibly insufficient and there is room for improvement.

As described above, for the deviant operation that occurred in the target period selected by the user, the statistical information generation unit 116 generates the statistical information on the basis of the analysis result (the history information 121) of the deviant operations analyzed by the deviant operation analysis unit 114, and can display the analysis result (the analysis result display screen 126) on the display input device 111. A user (a worker, a supervisor, or the like) can recognize which of elements (corresponding to the passage of time from the start of the work process) in the work process has room for improvement on the basis of the statistical information of the past deviant operations by seeing such analysis result display.

Figure 10:
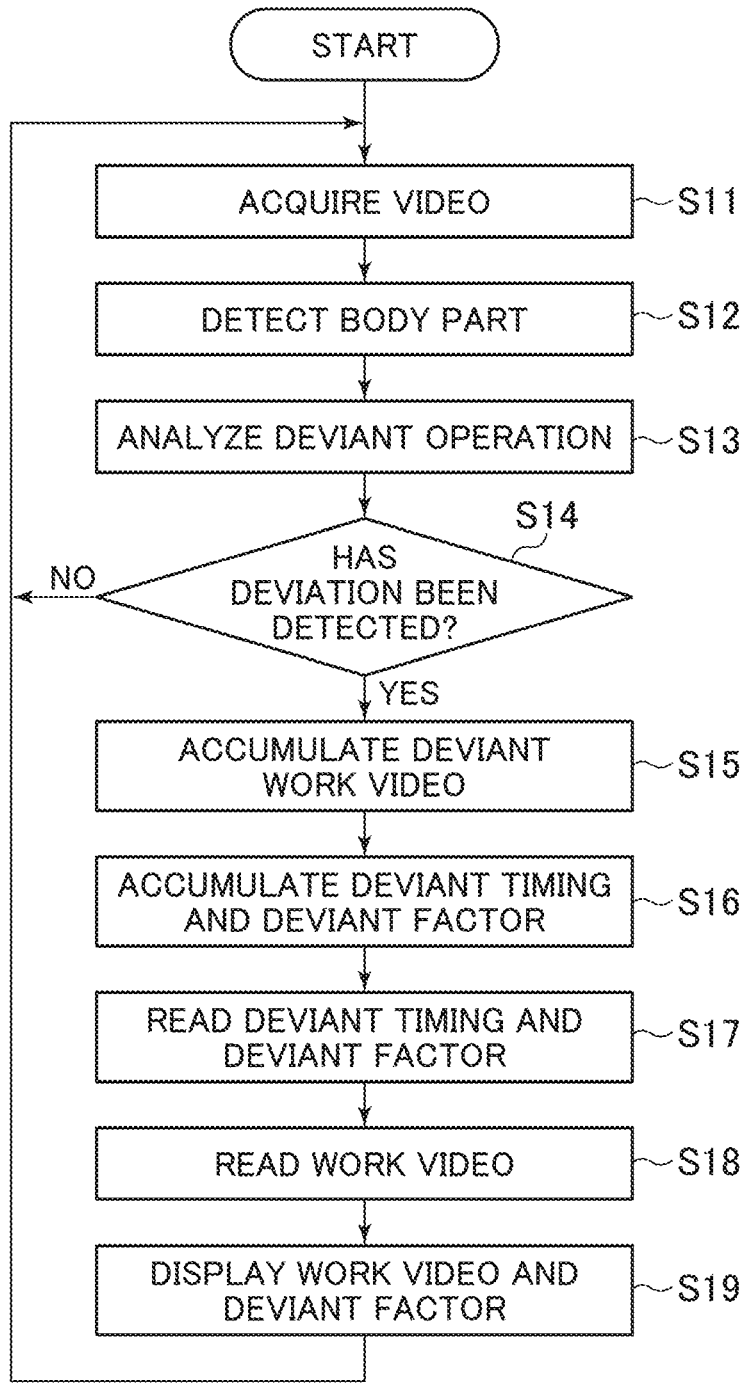
FIG. 10 is a flowchart for showing an example of a processing procedure of a work operation analysis process by the work operation analysis system according to the first embodiment.

FIG. 10 is a flowchart for showing an example of a processing procedure of a work operation analysis process by the work operation analysis system according to the first embodiment.

According to FIG. 10, the imaging device 112 photographs a state of a worker first (Step S11). Next, the body part detection unit 113 analyzes the video photographed in Step S11 using the method by Toshev et al. and Shotton et al. as described above, and acquires positional information of the body parts of the worker (Step S12).

Next, the deviant operation analysis unit 114 analyzes time-series information of the positional information of the body parts on the basis of the positional information of the body parts acquired in Step S12, and determines the presence or absence of a deviant operation (a detection of a deviant operation) to identify a deviant timing and a deviant factor (Step S13).

Next, the deviant operation analysis unit 114 determines whether or not the deviant operation has been detected (Step S14). In the case where the deviant operation has not been detected (NO in Step S14), the process returns to Step S11. In Step S14, in the case where the deviant operation has been detected (YES in Step S14), a work video corresponding to the deviant operation is accumulated in the deviant work video accumulation unit 118 as a deviant work video (Step S15), and further the deviant timing and the deviant factor (the history information 121) identified for the deviant operation are accumulated in the deviant operation analysis result accumulation unit 119 (Step S16).

After Step S16, the work video reproduction unit 115 reads the deviant timing and the deviant factor corresponding to the deviant operation from the deviant operation analysis result accumulation unit 119 (Step S17). Further, the work video reproduction unit 115 reads the deviant work video corresponding to the deviant operation from the deviant work video accumulation unit 118, and reads a normal work video from the normal work video accumulation unit 117 (Step S18).

Then, the work video reproduction unit 115 cuts a video having the predetermined time before and after the deviant timing on the basis of the above-described method using the information read in Step S17 and Step S18, and displays the cur work video, the deviant factor, and the like on the display input device 111 (Step S19). The process of Step S19 corresponds to the process of the above-described work video display, and the concrete display screen (the work video screen) is as being exemplified in FIG. 3 and FIG. 4.

After the termination of the process of Step S19, the process returns to Step S11, and the imaging device 112 photographs a state of the worker again for the next work process or elemental work.

It should be noted that during the processes of Steps S17 to S19, the deviant operation analysis can be preferably executed for other work (for example, subsequent work being continuously performed) in the work operation analysis system 11. In order to realize such a deviant operation analysis, for example, the processes of Steps S11 to S16 may be processed in the first thread, and the processes of Steps S17 to S19 may be processed in the second thread. By performing the parallel process in the plural threads as described above, the process of the next Step S11 can be executed in the first thread even during the execution of the processes of Steps S17 to S19 in the second thread. In addition, the processes performed in the second thread are not limited to Steps S17 to S19, and for example, the processes of Steps S15 to S19 may be performed in the second thread.

According to the work operation analysis system 11 of the first embodiment, after photographing a state of work by a worker, the deviant operation is continuously detected and the factor thereof is analyzed by performing the above-described work operation analysis. In the case where the deviant operation has been detected, the analysis result can be quickly displayed on the display input device 111 (the work video screen 122 in FIG. 3 and FIG. 4). Thus, the worker or the supervisor can immediately recognize how to modify the work by seeing the work video screen 122, and an effect can be expected for learning support for the worker and support of coaching the worker by the supervisor.

In addition, detail information of the deviant operation can be displayed at this time. Specifically, the timing when the deviant operation occurred can be identified and displayed in an elemental work unit finer than a work process unit. Further, the deviant factor can be displayed in such a manner that the deviant operation was caused by the "work position deviation" in which the position of the body part was different from that in the normal work or by the "work time deviation" in which the time required for the elemental work was different from predetermined time prescribed in the normal work.

In addition, apart from the above-described work operation analysis that can be executed in parallel with real-time progress of the work process, the statistical information related to the deviant operations that occurred in a desired period is analyzed on the basis of the history of the past deviant operations, and the analysis result can be displayed (the analysis result display screen 126 in FIG. 8 and FIG. 9). Thus, the supervisor can understandably support a point of the elemental work to be improved.

(2) Second Embodiment

Figure 11:
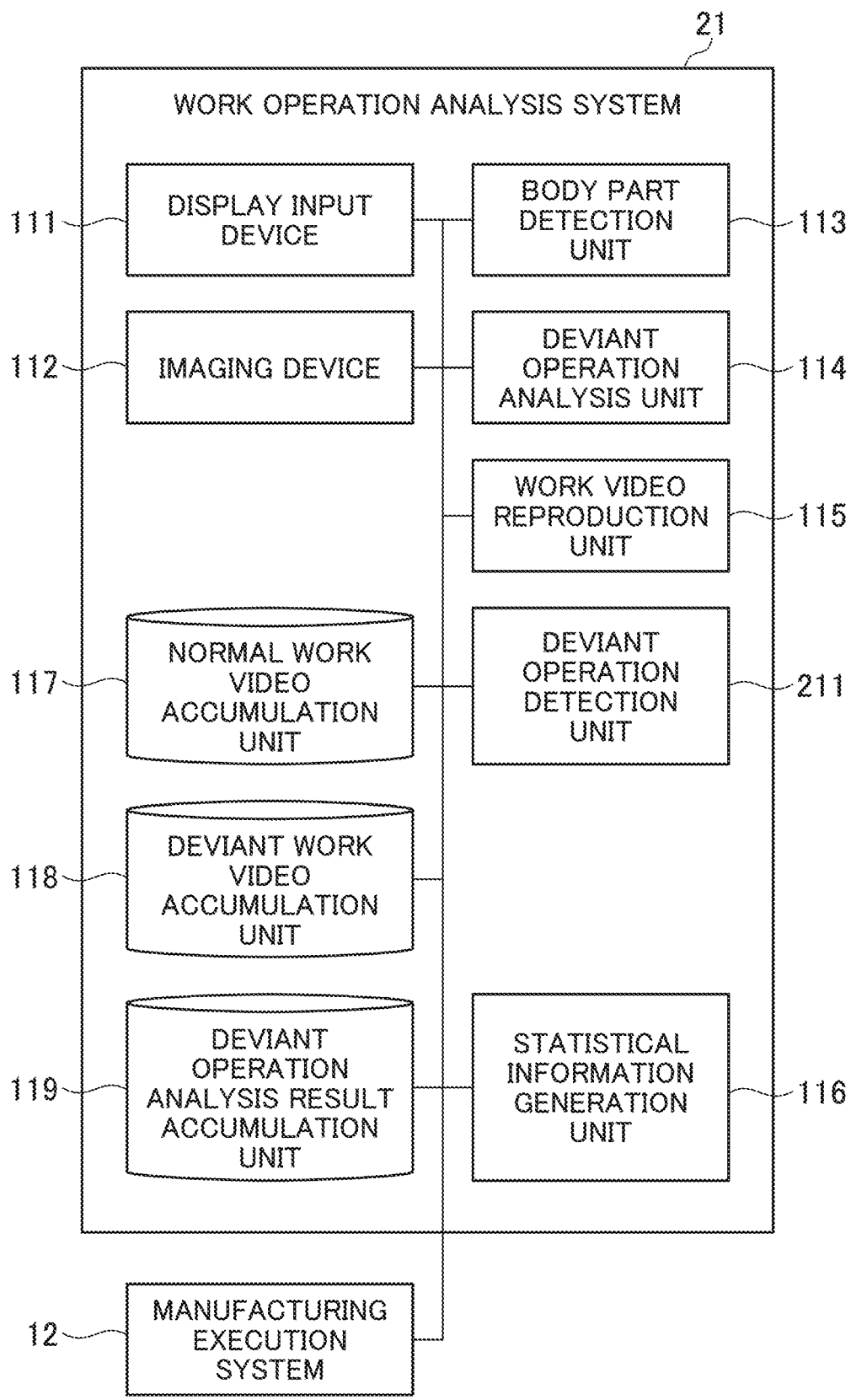
FIG. 11 is a block diagram for showing a configuration example of a work operation analysis system according to a second embodiment of the present invention.

FIG. 11 is a block diagram for showing a configuration example of a work operation analysis system according to a second embodiment of the present invention. A configuration of a work operation analysis system 21 according to the second embodiment will be described while referring to FIG. 11.

The work operation analysis system 21 shown in FIG. 11 has the same configuration as the work operation analysis system 11 shown in FIG. 1 except for addition of a deviant operation detection unit 211.

In addition, the work operation analysis system 11 is different from the work operation analysis system 21 in that the deviant operation analysis unit 114 determines the presence or absence of a deviant operation (a detection of a deviant operation) and identifies a deviant timing and a deviant factor in the work operation analysis system 11, whereas the deviant operation detection unit 211 determines the presence or absence of a deviant operation (a detection of a deviant operation) and the deviant operation analysis unit 114 identifies a deviant timing and a deviant factor in the work operation analysis system 21.

As similar to the description in the first embodiment, in the work operation analysis system 21, the imaging device 112 photographs a state in which a worker is working, and the body part detection unit 113 analyzes the photographed video to acquire positional information of the body parts of the worker. Then, the deviant operation detection unit 211 only determines the presence or absence of a deviant operation (a detection of a deviant operation) by analyzing time-series information of the "positional information of the body parts of the worker" acquired by the body part detection unit 113, and outputs the detection result.

A method of determining the presence or absence of a deviant operation on the basis of the time-series information of the "positional information of the body parts of the worker" by the deviant operation detection unit 211 is not particularly limited. However, the following is one example.

For example, a statistic is preliminarily calculated from each of plural pieces of time-series information of positional information of the body parts in normal work, and probability distribution of the statistics is further calculated. The statistics mean the average value, the median, or dispersion. Then, the deviant operation detection unit 211 calculates the similar statistics on the basis of the time-series information of the "positional information of the body parts of the worker" acquired from the work video. If the statistics thus calculated are compared in the probability distribution of the preliminarily-calculated statistics in the normal work, it is possible to calculate how close to the normal work. Thus, the deviant operation detection unit 211 can determine the presence or absence of the deviant operation by performing a threshold value process using a predetermined threshold value.

Figure 12:
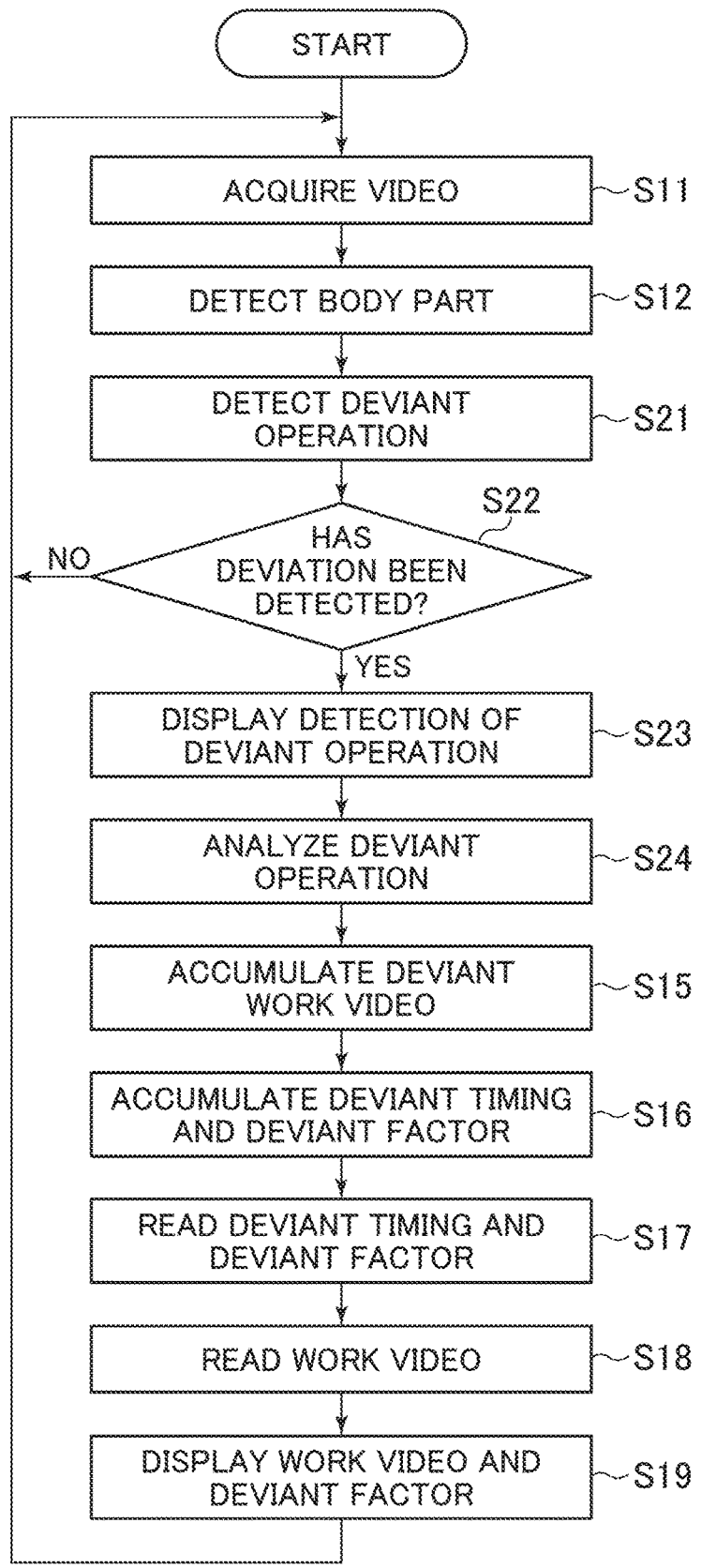
FIG. 12 is a flowchart for showing an example of a processing procedure of a work operation analysis process by the work operation analysis system according to the second embodiment.

FIG. 12 is a flowchart for showing an example of a processing procedure of a work operation analysis process by the work operation analysis system according to the second embodiment. The processing procedure shown in FIG. 12 will be described by focusing on processes different from the processing procedure of the work operation analysis process exemplified in FIG. 10 in the first embodiment, and the description of common processes will be omitted.

In FIG. 12, the processes of Step S11 in which the imaging device 112 photographs a state of a worker and Step S12 in which the body part detection unit 113 acquires positional information of the body parts of the worker are the same as those in FIG. 10.

Next, the deviant operation detection unit 211 analyzes time-series information of the positional information of the body parts on the basis of the positional information of the body parts acquired in Step S12, and determines the presence or absence of a deviant operation (a detection of a deviant operation) (Step S21).

Next, the deviant operation detection unit 211 determines whether or not the deviant operation has been detected (Step S22). In the case where the deviant operation has not been detected (NO in Step S22), the process returns to Step S11. In Step S22, in the case where the deviant operation has been detected (YES in Step S22), a screen (a deviant operation notification screen) indicating that the deviant operation has been detected is displayed on the display input device 111 (Step S23).

Figure 13:
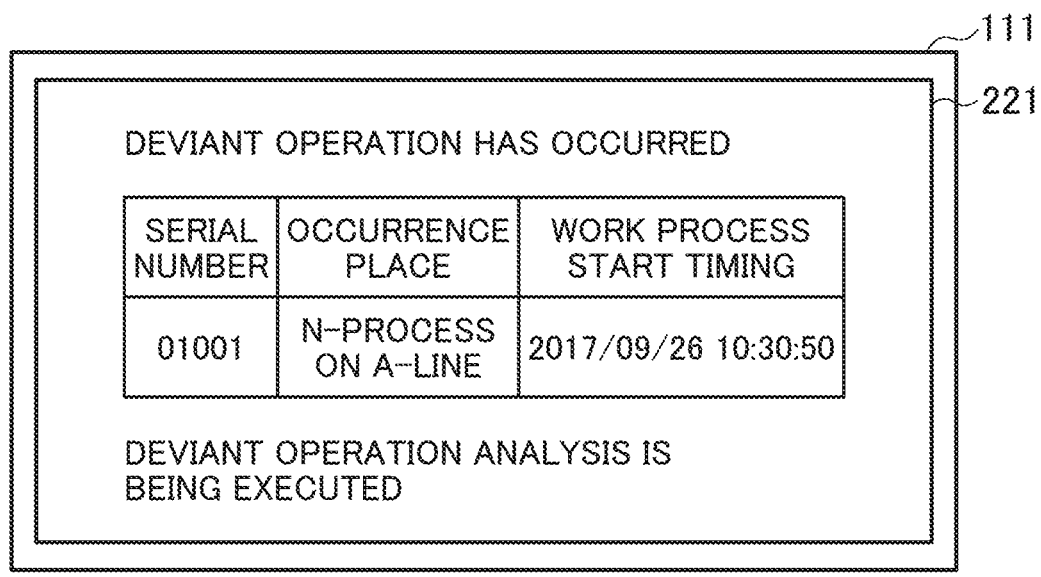
FIG. 13 is a diagram for showing an example of a deviant operation notification screen.

Here, FIG. 13 is a diagram for showing an example of the deviant operation notification screen. For example, a serial number (SN), an occurrence place, and a work process start timing are shown on a deviant operation notification screen 221 exemplified in FIG. 13. The items correspond to, for example, the items of the same names of the history information 121 described in FIG. 2. Here, if the serial number is set to match the serial number of a product to be assembled, cooperation with the manufacturing execution system 12 can be realized. It should be noted that the deviant operation notification screen 221 of FIG. 13 is merely an example, and other items may be displayed. However, since the deviant operation is not analyzed at this point, detail information such as a deviant factor is not shown.

Namely, in the work operation analysis system 21 according to the second embodiment, when the deviant operation is only detected, the deviant operation notification screen 221 is displayed. Accordingly, after the deviant operation occurred, the occurrence of the deviant operation can be quickly notified (earlier than the work video screen 122 in the first embodiment).

Thereafter, the deviant operation analysis unit 114 analyzes the time-series information of the positional information of the body parts on the basis of the positional information of the body parts acquired in Step S12, and identifies the deviant timing and the deviant factor of the deviant operation detected in Step S21 (Step S24).

The processes of Steps S15 to S19 thereafter are the same as FIG. 10, and thus the explanation thereof will be omitted. It should be noted that as similar to the description in FIG. 10, by performing the parallel process in plural threads even in the work operation analysis process of FIG. 12, other work operations can be analyzed during an analysis of one work operation. Specifically, while the processes of Steps S17 to S19 (or Step S24 and Steps S15 to S19) are executed in the second thread, the processes of the next Steps S11 to S16 (or Steps S11 to S23) may be performed in the first thread.

In addition, in the processing procedure of FIG. 12, in the case where the deviant operation detection unit 211 has not detected the deviant operation (NO in Step S22), the process returns to Step S11. However, as another example of the processing procedure, the determination process of the detection of the deviant operation in Step S22 may be performed after the deviant operation analysis unit 114 analyzes the deviant operation in Step S24. By setting such a processing procedure, even in the case where the deviant operation has not been detected by the deviant operation detection unit 211, the determination process of the detection of the deviant operation is performed in Step S22 in the case where the occurrence of the deviant operation has been detected again by the detailed analysis by the deviant operation analysis unit 114. Thus, the notification and information gathering at the time of the detection of the deviant process can be reliably performed.

According to the work operation analysis system 21 of the second embodiment, right after photographing a state of work by a worker, the deviant operation is continuously detected by performing the above-described work operation analysis. In addition, in the case where the deviant operation has been detected, the occurrence of the deviant operation can be quickly notified to the worker, the supervisor, or the like by displaying the deviant operation notification screen 221. The timing of the notification can be realized earlier than the display (Step S19 in FIG. 10) of the work video screen 122 in the first embodiment, and thus the detection of the deviant operation can be realized with a higher real-time property during the execution of the work.

Further, in the work operation analysis system 21 according to the second embodiment, after the deviant operation notification screen 221 is displayed by detecting the deviant operation, the deviant operation is analyzed to identify the deviant timing and the deviant factor, and the analysis result can be displayed on the work video screen 122 as similar to the work operation analysis system 11 according to the first embodiment. At this time, the occurrence timing of the deviant operation is identified and displayed in an elemental work unit, and the cause of the deviant operation can be displayed by identifying the "work position deviation" or the "work time deviation". Therefore, as similar to the first embodiment, the worker or the supervisor can immediately recognize how to modify the work, and an effect can be expected for learning support for the worker and support of coaching the worker by the supervisor.

In particular, the work operation analysis system 21 according to the second embodiment includes multistage analysis steps such as a first analysis step in which only the detection of the deviant operation is analyzed and notified when the deviant operation has occurred and a second analysis step in which the detail (the deviant timing and the deviant factor) of the deviant operation is analyzed and notified as described above. In such a configuration, early notification can be realized by reducing the processing load in the first analysis step, and the notification of the detailed analysis result can be realized in the second analysis step although it takes more time than the first analysis step. As a result, the worker or the supervisor can flexibly use the notification by the multistage steps according to the use. For example, constant monitoring of delicate work increases a burden on the supervisor who supervises work in real time, and it is most important to immediately notify the occurrence of the deviant operation by the first analysis step. In addition, in the case where the notification by the first analysis step is made, the notification by the second analysis step subsequent thereto is confirmed and the detail thereof is confirmed. Thus, support information about problems of the work and points of improvement can be obtained.

In addition, as similar to the work operation analysis system 11 according to the first embodiment, apart from the above-described work operation analysis that can be executed in parallel with real-time progress of the work process, the statistical information related to the deviant operations that occurred in a desired period is analyzed on the basis of the history of the past deviant operations, and the analysis result can be displayed (the analysis result display screen 126 in FIG. 8 and FIG. 9). Thus, the supervisor can understandably support a point of the elemental work to be improved.

It should be noted that the present invention is not limited to the above-described embodiments, and includes various modified examples. For example, the embodiments have been described in detail to easily understand the present invention, and the present invention is not necessarily limited to those including all the configurations described above. In addition, some configurations of an embodiment can be replaced by a configuration of another embodiment. In addition, a configuration of an embodiment can be added to a configuration of another embodiment. In addition, some configurations of each embodiment can be added to, deleted from, and replaced by other configurations.

In addition, some or all of the above-described configurations, functions, processing units, processing means, and the like may be realized using hardware by designing with, for example, integrated circuits. In addition, each of the above-described configurations, functions, and the like may be realized using software in such a manner that a processor interprets and executes a program realizing each function. Information of a program, a table, a file, and the like realizing each function can be stored in a recording device such as a memory, a hard disk, or an SSD (Solid State Drive), or a recording medium such as an IC card, an SD card, or a DVD. In addition, the control lines and the information lines considered to be necessary in the explanation are shown, but all the control lines and the information lines in a product are not necessarily shown. In practice, almost all the configurations may be considered to be connected to each other in implementation.

LIST OF REFERENCE SIGNS 11, 21 work operation analysis system
12 manufacturing execution system
111 display input device
112 imaging device
113 body part detection unit
114 deviant operation analysis unit
115 work video reproduction unit
116 statistical information generation unit
117 normal work video accumulation unit
118 deviant work video accumulation unit
119 deviant operation analysis result accumulation unit
121 history information
122 (122a, 122b) work video screen
123 operation standby screen
124 past deviant operation confirmation screen
125 target period decision screen
126 (126a, 126b) analysis result display screen
211 deviant operation detection unit
221 deviant operation notification screen

The invention claimed is:

1. A work operation analysis system comprising:
at least one memory configured to store a program; and
a central processing unit (CPU) coupled to the at least one memory and configured to execute the program to:
  accumulate a normal work video obtained by preliminary photographing a series of normal elemental works;
  analyze a work video obtained by photographing work of a worker on a work process basis, the work process comprising a series of elemental works, and, in a case where a deviant operation different from normal work has been detected based on comparison between the elemental works and the normal elemental works, identify an occurrence timing of the deviant operation;
  detect a body part of the worker to acquire a position of a specific body part of the worker and a work position deviation when the detected position of the body part of the worker is located different from the position of the specific body part of the worker in the normal work based on the work video;
  identify a factor of the deviant operation as at least one of:
    a work time deviation caused when a time which spent in any one of the elemental works is longer or shorter compared to a predetermined time as work time in the normal elemental works in the normal work video corresponding to the elemental works; and
    the work position deviation caused when the detected position of the specific body part of the worker is located different from the position of the specific body part of the worker in the normal work video corresponding to the detected position;
  accumulate a deviant work video obtained when the deviant operation occurred; and display the normal work video and the deviant work video having the predetermined time including the occurrence timing of the deviant operation, wherein the normal work video and the deviant work video are displayed side by side on a display screen, and wherein the identified factor is displayed with the deviant work video.

2. The work operation analysis system according to claim 1, wherein the CPU is further configured to execute the program to:

accumulate an analysis result; and generate predetermined statistical information using accumulated information and display the generated statistical information on the display screen.

3. The work operation analysis system according to claim 2, wherein the generated statistical information is information indicating an occurrence frequency of the deviant operation for a time series of the work process.

4. The work operation analysis system according to claim 2, wherein the CPU is further configured to execute the program to:

generate the statistical information in a different display mode in accordance with the factor of the deviant operation, and display the generated statistical information on the display screen.

5. The work operation analysis system according to claim 1, wherein the CPU has:

a first analysis unit that is configured to execute the program to detect the deviant operation; and a second analysis unit that is configured to execute the program to identify the occurrence timing of the deviant operation after the detection of the deviant operation by the first analysis unit, wherein, in the case where the deviant operation has been detected, the first analysis unit displays a display screen notifying the occurrence of the deviant operation without waiting for a process by the second analysis unit, and wherein the CPU is further configured to execute the program to display the normal work video and the deviant work video having another predetermined time including the occurrence timing of the deviant operation after the occurrence timing of the deviant operation is identified by the second analysis unit.

6. A work operation analysis method comprising:

a normal work video accumulation step of accumulating a normal work video obtained by preliminarily photographing normal work, the normal work comprising a series of normal elemental works;

a deviant operation analysis step of:

analyzing a work video obtained by photographing work of a worker on a work process basis, the work process comprising a series of elemental works, and, in a case where a deviant operation different from normal work has been detected based on comparison between the elemental works and the normal elemental works, identifying an occurrence timing of the deviant operation;

detecting a body part of the worker to acquire a position of a specific body part of the worker and a work position deviation when the detected position of the body part of the worker is located different from the position of the specific body part of the worker in the normal work based on the work video; and identifying a factor of the deviant operation as at least one of:

a work time deviation caused when a time which spent in any one of the elemental works is longer or shorter compared to a predetermined time as work time in the normal elemental works in the normal work video corresponding to the elemental works; and the work position deviation caused when the detected position of the specific body part of the worker is located different from the position of the specific body part of the worker in the normal work video corresponding to the detected position;

a deviant work video accumulation step of accumulating a deviant work video obtained when the deviant operation occurred; and a display step of displaying the normal work video and the deviant work video having the predetermined time including the occurrence timing of the deviant operation identified in the deviant operation analysis step on a display device, wherein the normal work video and the deviant work video are displayed side by side on the display device, and wherein the identified factor is displayed with the deviant work video.

7. The work operation analysis method according to claim 6, further comprising:

a deviant operation analysis result accumulation step of accumulating an analysis result by the deviant operation analysis step; and a statistical information generation step of generating predetermined statistical information using information accumulated in the deviant operation analysis result accumulation step and displaying the generated statistical information on the display device.

8. The work operation analysis method according to claim 7, wherein the statistical information generated in the statistical information generation step is information indicating an occurrence frequency of the deviant operation for a time series of the work process.

9. The work operation analysis method according to claim 7, wherein in the statistical information generation step, the statistical information is generated in a different display mode in accordance with the factor of the deviant operation, and the generated statistical information is displayed on the display device.

10. The work operation analysis method according to claim 6, wherein the deviant operation analysis step has:

a first analysis step of detecting the deviant operation; and a second analysis step of identifying the occurrence timing of the deviant operation after the first analysis step, wherein in the first analysis step, in the case where the deviant operation has been detected, a display screen notifying the occurrence of the deviant operation is displayed on the display device without waiting for an execution of the second analysis step, and wherein in the display step, the normal work video and the deviant work video having predetermined time including the occurrence timing of the deviant operation are displayed on the display device after the occurrence timing of the deviant operation is identified in the second analysis step.

11. The work operation analysis system according to claim 1, wherein, when the factor of the deviant operation is identified as the work position deviation, the deviant work video displays the position of the specific body part of the worker located different from the position of the specific body part of the worker in the normal work.

\* \* \* \* \*